Dec. 5, 1967  F. M. HECK, JR  3,356,587
FUEL ASSEMBLIES FOR A NEUTRONIC REACTOR
Filed June 21, 1963  7 Sheets-Sheet 1

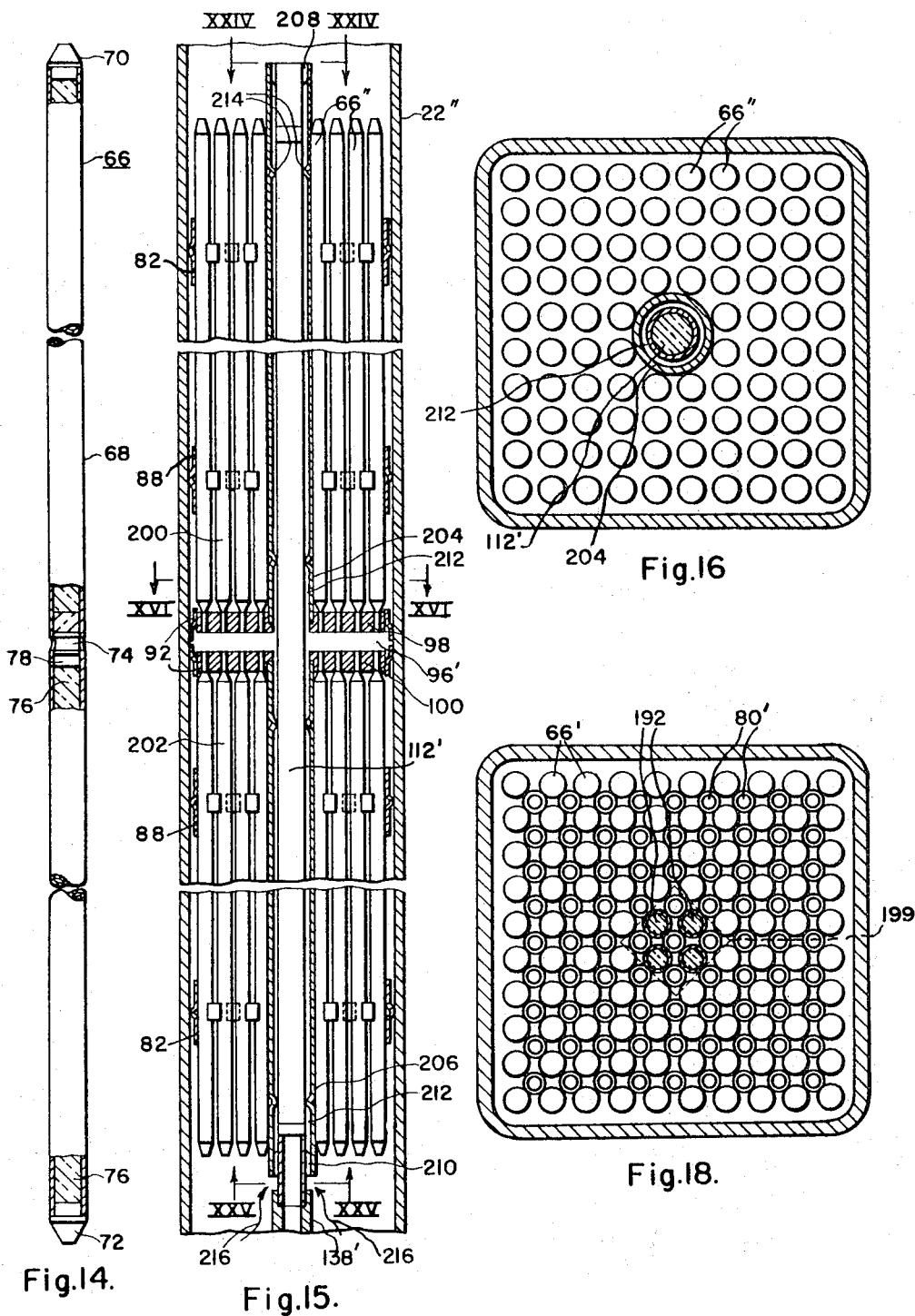

Dec. 5, 1967   F. M. HECK, JR   3,356,587
FUEL ASSEMBLIES FOR A NEUTRONIC REACTOR
Filed June 21, 1963   7 Sheets-Sheet 5

United States Patent Office 3,356,587
Patented Dec. 5, 1967

3,356,587
FUEL ASSEMBLIES FOR A NEUTRONIC REACTOR
Francis M. Heck, Jr., Pitcairn, Pa., assignor to Westinghouse Electric Corporation, Pittsburgh, Pa., a corporation of Pennsylvania
Filed June 21, 1963, Ser. No. 289,532
10 Claims. (Cl. 176—78)

The present invention relates to a fuel assembly arranged for supporting a mass of fuel material with coolant channels in a relatively closely spaced array and particularly adapted for use in connection with a number of such fuel assemblies in the active region or core structure of a neutronic reactor.

In a neutronic reactor, as is well known, a quantity of one or more of the fissile isotopes U 233, U 235, Pu 239 or Pu 241 are supported in a relatively closely spaced array and in a configuration such that a controlled neutronic chain reaction can take place. Desirably, a quantity of a blanket material consisting of one or more of the fertile isotopes Th 232 or U 238 or Pu 240 is supported adjacent the chain reacting mass so that the fertile isotopes will be transmuted by excess fission neutrons to certain ones of the aforementioned fissile isotopes. Alternatively or concomitantly, the fertile isotope can be commingled in a more or less uniform manner with the fissile isotope or isotopes.

For certain purposes in the present specification and claims the aforementioned fissile and fertile isotopes are referred to collectively or generically as nuclear fuel materials.

Neutronic reactors are divided into three broad categories with reference to that portion of the neutron spectrum into which the velocities of the propagational neutrons fall. Thus, thermal and epithermal reactors contain chain reacting masses wherein the reaction is propagated primarily by neutrons having respectively the speed of thermally agitated hydrogen atoms or somewhat higher. On the other hand, in fast reactors the chain reaction is propagated with neutrons traveling at speeds in the neighborhood of about 7,000,000 meters per second. That is to say, most of the fissional neutrons have velocities categorized as fast.

Because the thermal output of a given chain reacting mass is practically unlimited, the size of the reactor core or active region is dependent almost solely upon the required heat transfer area necessary to extract the desired thermal output of the core by means of a coolant fluid flowing through passages therefor in the reactor core. Therefore, due to the tremendous power capabilities of a neutronic reactor, it is highly desirable to so construct the reactor that the chain reacting mass is provided with a built-in or inherent fail-safe mechanism. In the case of most thermal or epithermal reactors a net negative temperature coefficient of reactivity is provided. Thus the reactor core becomes less reactive with increase in core temperature so that at excessive operating temperatures sufficient neutrons in the requisite spectral portion are not available for the propagation of a chain reaction and the reactor in effect shuts itself down.

However, in the case of a fast reactor, where no moderator material is utilized, the core structure thereof inherently and normally exhibits a positive or an insufficient negative coefficient of reactivity. This follows from the fact that the fuel elements or the fuel element assemblies of the reactor core tend to bow toward the central region of the core assuming that the latter is normally the hottest or highest neutron flux part of the core. This bowing of the fuel assemblies results from the fact that the hotter or higher flux side of the assembly will elongate to a greater extent causing the entire assembly to bow as a bending beam with its convex side toward the hottest or highest flux portion of the reactor core.

Unfortunately, this bowing of the fuel assemblies has the effect of displacing additional fuel material toward the hottest or highest flux portion of the reactor core with the result that the reactor core becomes even more reactive. This tendency towards a positive coefficient of reactivity exhibited by the fast reactor may be partially compensated by the thermal elongation of the fuel elements or the fuel element assemblies of the core structure, which elongation of course would have the effect of displacing fuel material away from the central area of the chain reacting mass.

Therefore, for the safe operation of a fast reactor, or other reactors having a net positive or an insufficient negative coefficient of reactivity, it is necessary to introduce some structure or means to compensate for such insufficiency in the negative coefficient of reactivity. One arrangement for doing this is the provision of means actuated by increases in power level, neutron flux, or temperature which will increase the spacing between some or all of the fuel elements or fuel assemblies and thereby lower the reactivity of the core. Of course, the normal thermal elongation of the fuel elements may serve to move fuel material away from the center of the core; however, with the known fuel compounds such as the oxides, carbides and nitrides of fissile isotopes the thermal expansion is not adequate to overcome the aforementioned positive coefficient of reactivity. Moreover, the expansion characteristics of these materials are often anomalous or otherwise unpredictable. Moreover, since the aforementioned compounds are endowed with unpredictable thermal expansions, it is usually necessary that they be so contained or constrained by the cladding materials normally provided on the fuel elements so that their irregular thermal movements can be sufficiently minimized that the normal behavior of the reactor core can be predicted in the anticipated range of operating temperatures.

In view of the foregoing, it is an object of the invention to provide a novel and efficient fuel element assembly for a neutronic reactor.

Another object of the invention is to provide a fuel element assembly of the character described, which is adapted particularly for use with a fast reactor.

Still another object of the invention is to provide a fuel element assembly having means therein for moving the fuel material contained within the assembly in such a manner that the gross volume of the fuel material increases with an increasing power level so as to reduce the reactivity therein.

A further object of the invention is the provision of a fuel element assembly for a neutronic reactor, having means associated therewith for moving portions of the fuel material contained in said fuel assembly away from the central or hottest region of the reactor core with an increase in operating temperature thereof.

Another object of the invention is the provision of a fuel element assembly wherein groups of fuel elements supported within the assembly are moved longitudinally away from the central, hottest or highest flux part of the reactor core upon an increase in the power level or the neutron flux level of the core.

Still another object of the invention is the provision of an elongated fuel element assembly having at least two groups of fuel elements spaced along the length thereof and expansible means controlled by temperature changes therein or in the reactor core for varying the space between the groups of fuel elements. An ancillary object is the provision of a fuel element as last characterized wherein the spaces between the groups of adjacent fuel assemblies are displaced longitudinally from one another in order to avoid radiation streaming therethrough.

Still another object of the invention is the provision of an elongated fuel element assembly having movable bundles of fuel elements disposed therein and in addition having blanket or fertile fuel elements disposed generally at the ends of the assembly and spaced from the aforementioned fuel element bundles so as not to interfere with movement of the latter.

A still further object of the invention is the provision of an elongated fuel element assembly having thermally actuated means for displacing fuel contained within the assembly generally toward the respective end portions of the assembly and having supporting means for the fuel material which are engaged with the aforementioned thermally actuated means in a manner such that any inherent thermal expansion of the fuel material is directed toward displacing the fuel material still farther toward the respective ends of the fuel assembly.

These and other objects are accomplished by the modifications of the invention disclosed herein. Briefly, the invention comprises an elongated fuel element assembly casing or housing and a plurality of fuel element bundles mounted in spaced relation within the housing. One end of one of the bundles is fixedly mounted relative to the other ends of the bundles. A continuous fuel element or elements is extended through the central axes of all of the bundles for engagement with one end of each of the remaining bundles. The aforementioned continuous fuel rod or element, or similar continuous member not containing a fuel material, preferably is fabricated from a thermally expansible material having a substantially greater coefficient of expansion or greater rate of expansion than that of the remaining or surrounding fuel elements. Thus, upon increase in temperature a unit portion of the continuous fuel element or other member elongates to a greater degree and/or rate than a unit portion of the surrounding fuel elements so that the remainder of the fuel bundles are displaced along the length of the fuel assembly away from the adjacent ends of the more or less fixed fuel bundle.

In another arrangement of the invention the juxtaposed ends of the fuel elements of adjacent fuel bundles are secured respectively to end plates slidably mounted within the fuel assembly housing, which in turn are joined respectively to a pair of tubular supporting members. The tubular supporting members preferably are fabricated from materials having a low coefficient of thermal expansion and extend completely through their respective fuel bundles for securance to the continuous fuel rod or member at respective locations adjacent the far ends of the aforementioned adjacent fuel bundles. With this arrangement any thermal expansion of the fuel elements comprising the bundles is added to the displacing action imparted to these bundles by thermal elongation of the central supporting fuel rod or members.

In still other arrangements of the invention it is contemplated that an additional bundle of blanket or fertile fuel elements be supported adjacent each end of the fuel assembly. One end of the fertile bundle desirably is fixed relative to the fuel assembly housing while the other end is slidably mounted therein for thermal elongation. The blanket bundles are so mounted within the fuel assembly that elongation thereof will not interfere with the longitudinal displacement of the fuel element bundles mounted within the assembly.

A fuel assembly is further arranged such that any bowing of the individual fuel bundles therewithin will displace fuel material away from the central or hottest part of the reactor core rather than toward the aforementioned part of the core as in conventional fuel elements. This is accomplished by affording for example rigid lateral support adjacent one end of each fuel bundle, for example the far end portions, while resiliently and laterally supporting the adjacent end portions of the fuel bundles. As will be pointed out hereinafter the adjacent or juxtaposed ends of the adjacent fuel bundles can be in contact at room temperature but of course will be displaced at reactor operating temperatures by the expansible continuous fuel element or elements or other member. Of course, when the fuel bundles are displaced at reactor operating temperatures the juxtaposed ends of adjacent bundles then are free to bow away from the central portion of the reactor core by movement against their lateral resilient supporting means.

The foregoing and other features, advantages and objects of the invention will be elaborated upon during the forthcoming detailed description of the invention, particularly when taken in conjunction with the accompanying drawings, wherein:

FIG. 14 is an enlarged elevational view, partially in longitudinal section, of a typical fuel rod employed in the fuel assembly of FIG. 1;

FIG. 15 is a partial, longitudinally sectioned view of another form of the fuel assembly arranged in accordance with the teachings herein;

FIG. 16 is an enlarged cross-sectional view of the fuel assembly illustrated in FIG. 15 and taken along reference line XVI—XVI thereof;

FIG. 18 is an enlarged cross-sectional view of the fuel assembly of FIG. 17 and taken along any of the reference lines XVIII—XVIII thereof;

Figure 1:
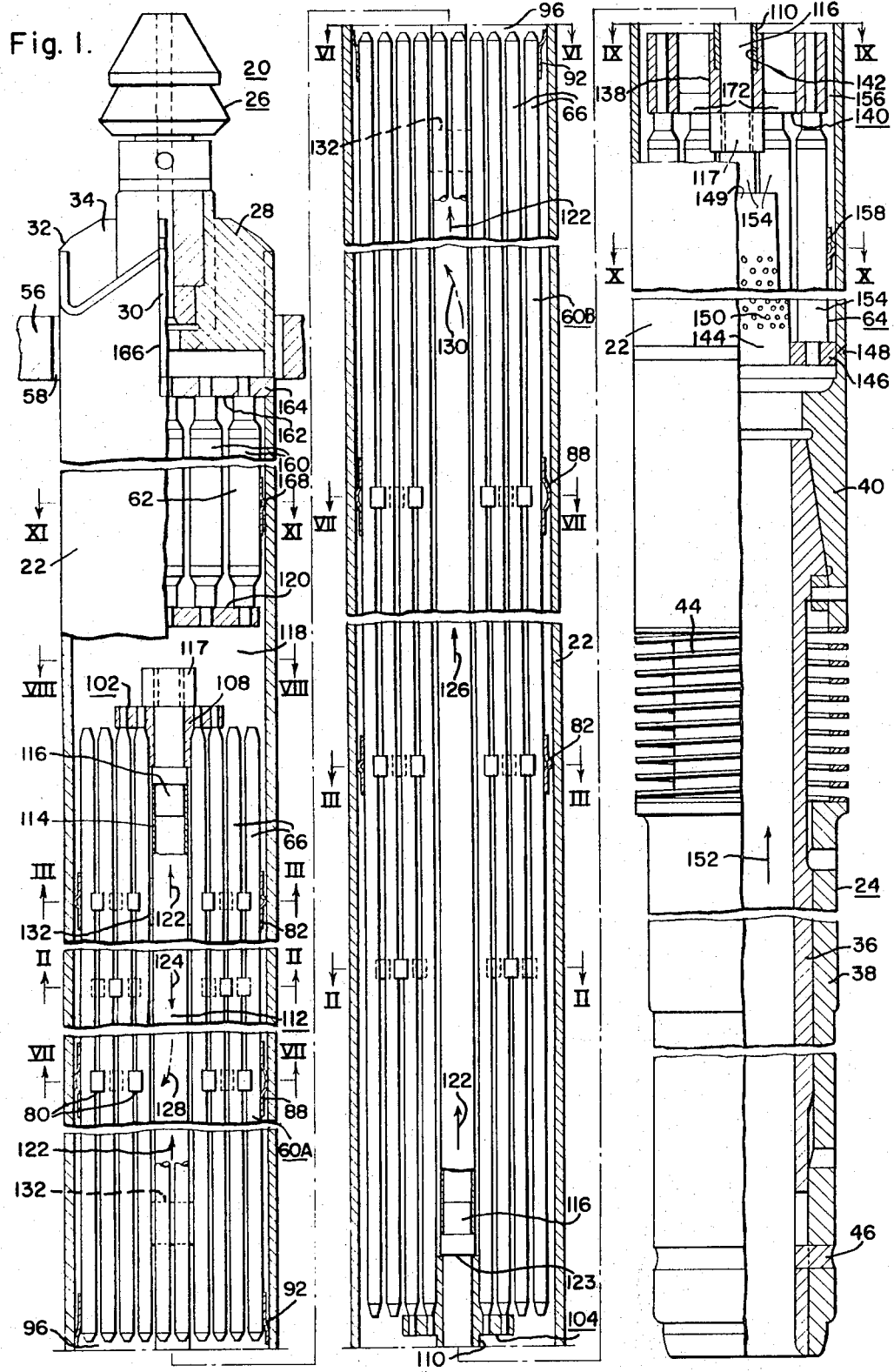
FIG. 1 is a longitudinally sectioned view of a fuel assembly for a nuclear reactor, which assembly is arranged in accordance with the teachings of the present invention and shows an upper portion of the adjacent core structure of the reactor.
Figure 12:
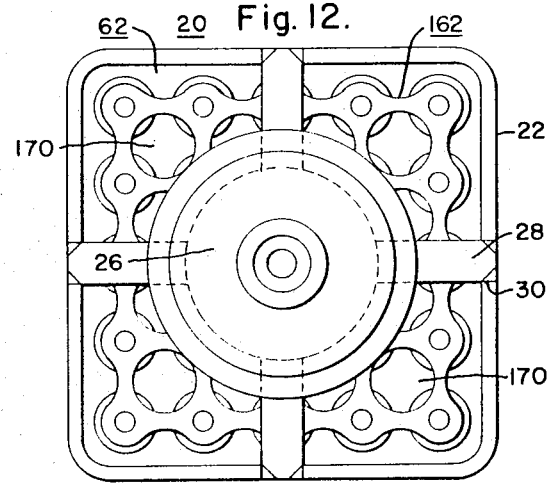
FIG. 12 is an enlarged top end view of the fuel assembly as illustrated in FIG. 1 of the drawings.
Figure 13:
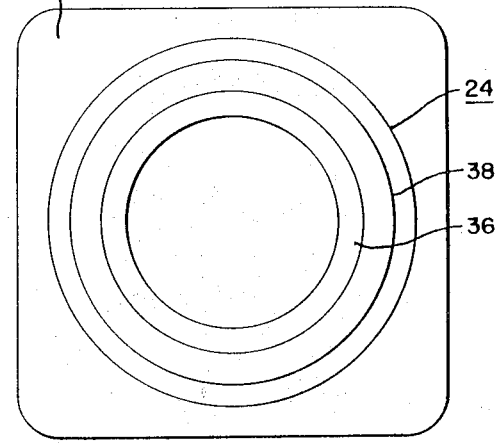
FIG. 13 is an enlarged bottom end view of the fuel assembly as illustrated in FIG. 1 of the drawings.

Referring now to FIGS. 1, 12 and 13 of the drawings, the illustrative embodiment of the invention depicted therein comprises a blanket type fuel assembly 20 having in this example an elongated tubular casing 22. The tubular casing 22 for this arrangement of the invention is formed with a substantially square cross-section and, its open ends are provided respectively with a flow nozzle assembly, indicated generally by the reference character 24, and with a spoke mounted manipulator lifting hook arrangement denoted by the reference character 26. For example, the lifting hook 26 is secured to the casing 22 by a plurality of substantially planar spokes 28 with four being employed in this example of the invention. The spokes 28 are inserted into and welded at a like number of respective end slots 30 formed in the housing 22. Desirably, the housing or casing 22 is cut away, as denoted by the reference character 32, in the areas between respective adjacent spokes 28 so that greater fluid flow access to the casing 22 is afforded by the resultant flow openings 34.

At the opposite end of the casing 22, the nozzle assembly 24 includes a pair of nested concentric tubular members 36 and 38. The outer tube 38 is slidably mounted upon the inner tube 36, while the latter tube is secured to a thickened end portion 40 which is in turn welded or otherwise secured to the adjacent end of the tubular casing 22. In order to provide shock absorbing action when the fuel assembly is loaded in a vertical position within a reactor core structure denoted generally by the reference character 42 (FIG. 17), the outer tubular member 38 and a stop member 46 secured thereto are biased toward the adjacent end of the fuel assembly by a substantial spring 44.

Figure 17:
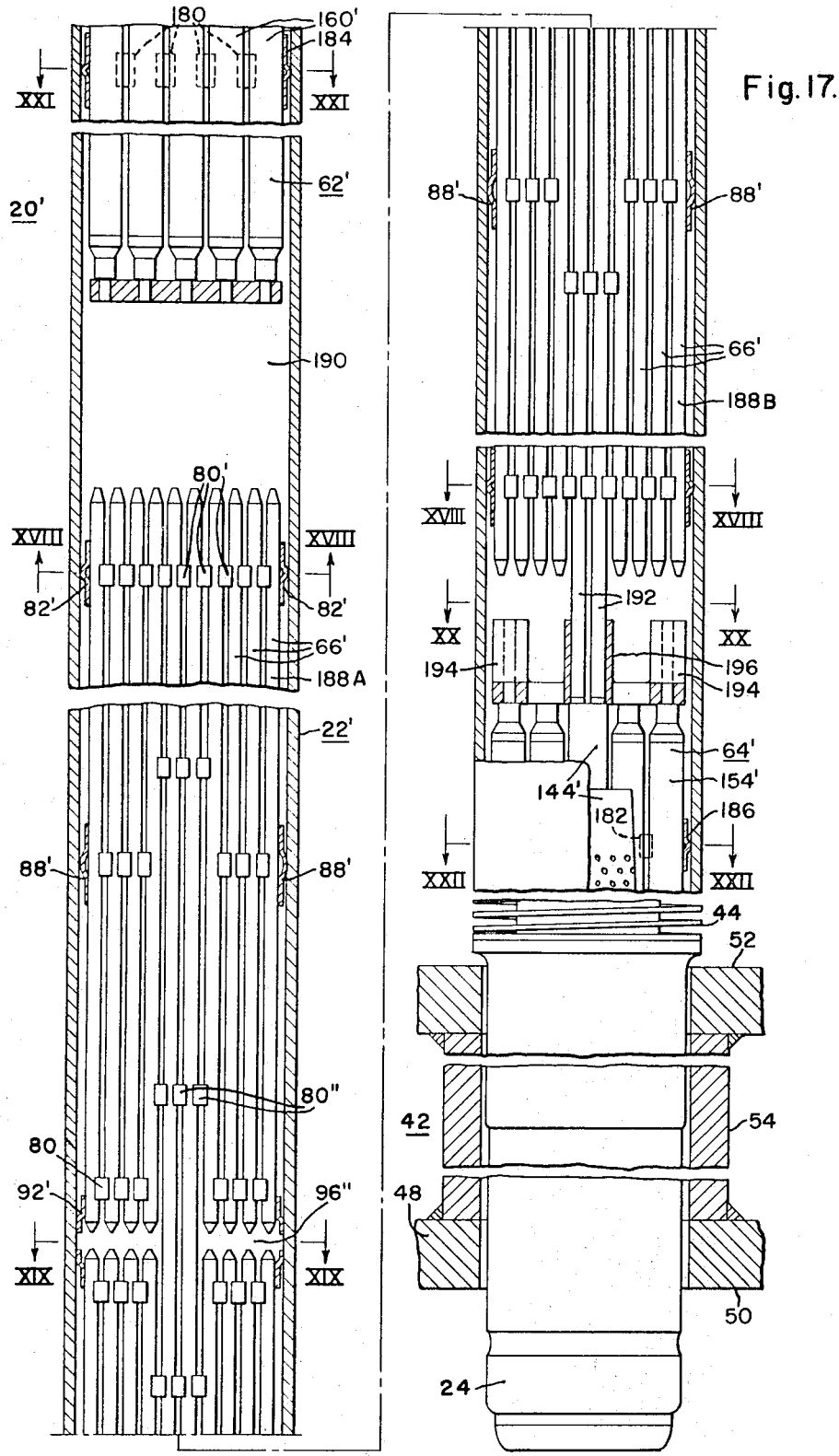
FIG. 17 is a partial, longitudinally sectioned view of still another form of the reactor fuel assembly arranged in accordance with the teachings herein and shows a lower portion of the adjacent core structure of the reactor.

The cross-sectional configuration of the nozzle 24 desirably is circular, as illustrated in FIG. 13 of the drawings, in order to facilitate insertion in the complementary opening in a lower core plate assembly 48 (FIG. 17) of the reactor core structure 42. In this arrangement, as shown in FIG. 17, the lower core plate assembly 48 includes a pair of spaced plates 50 and 52 whose separation is maintained by a plurality of spacer tubes 54 which in addition receive the fuel assembly nozzle assemblies 24. The use of the spaced bottom core plates 52 and 50 of the core enhances the beam strength of the lower core plate assembly 48.

The upper or left end of the fuel assembly 20, as viewed in FIG. 1 of the drawings, is similarly supported in a complementary aperture formed in an upper core plate 56, which is also part of the reactor core structure 42. In this case, however, the aperture 58 is of generally square configuration so as to conform with that of the fuel assembly casing 22.

Mounted within the casing 22 and intermediately of the ends thereof are a plurality of fuel bundles, with two such bundles 60A and 60B being employed in this example of the invention. The bundles 60A and 60B are disposed in tandem generally between a pair of blanket fuel bundles 62 and 64, which are described hereinafter in greater detail.

Each of the fuel bundles 60A and 60B in this arrangement of the invention includes a plurality of relatively closely spaced fuel rods 66, with 96 such rods being employed in each of the bundles 60A and 60B in this example of the invention. As better shown in FIG. 14 of the drawings, each of the fuel rods 66 includes a casing structure 68 or cladding tube which is closed at its ends by a pair of respective frustoconical end plugs 70 and 72. Within the casing tube 68, the fuel rod is divided into a number of compartments by a plurality of spaced disks 74 which are secured at such locations by crimping the adjacent portions of the casing tube 68. The space in each of the aforementioned compartments is substantially filled by a plurality of fuel pellets denoted generally by the reference character 76, leaving an expansion space 78 within each compartment. Within each fuel bundle 60A or 60B, the fuel rods 66 are joined laterally to one another with a plurality of ferrules or short tubular members 80 in the manner described in greater detail and claimed in a copending coassigned application of Erling Frisch, entitled "Fuel Element Assembly for a Nuclear Reactor," Ser. No. 635,911, filed Jan. 23, 1957, and now abandoned. Suffice it to say however that with the arrangement shown each of bundles 60A and 60B is assembled into a rigid beam like structure by a plurality of lateral rows or arrays of the ferrules 80, which are spaced along the length of each bundle 60A or 60B and joined rigidly to adjacent ones of the fuel rods, as by brazing or the like.

As will become more evident hereinafter, the aforedescribed rigidized beam structure of each of the fuel bundles 60A and 60B is particularly useful in a fast neutronic reactor in order to produce a controlled displacement of the fuel bundles 60A and 60B or portions thereof in the longitudinal direction relative to the fuel assembly for the purpose of providing a negative coefficient of reactivity in response to increases in neutron flux density, power level, or temperature. The rigidized beam structure is not an essential to the embodiment of this invention but, in this arrangement of the invention, permits the simultaneous utilization of controlled bowing as will become more evident hereinafter, which is described in detail and claimed in a copending coassigned application of H. W. Keller et al., "Fuel Assembly for a Neutronic Reactor," Ser. No. 289,469, filed June 21, 1963.

Figure 4:
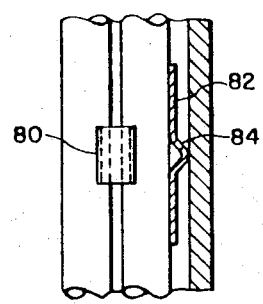
FIG. 4 is an enlarged partial longitudinally sectioned view of the fuel assembly illustrated in FIG. 3 of the drawings and taken along reference line IV—IV thereof.

In furtherance of these purposes, each of the fuel bundles 60A and 60B is slidably mounted at its lateral peripheral engagement with the inner surfaces of the casing structure 22. Adjacent the respective outward or opposite end portions of the fuel bundles 60A and 60B, and as denoted by the reference lines III—III, a plurality of peripheral strap members 82 are secured at spaced locations on each of the bundles 60A and 60B as by brazing. As better shown in FIG. 3 of the drawings, the strap members 82 each completely extend about the girth of the associated fuel bundles 60A or 60B. Located on each strap 82 are a plurality of positioning dimples 84 (FIG. 4) for positive and rigid engagement with the adjacent surfaces of the casing structure 22. Thus, the positioning dimples 84 serves to locate positively the associated fuel bundles 60A or 60B coaxially within the casing structure 22. Because of their rigid engagement, the adjacent end portions of the fuel bundles 60A and 60B are not free to move laterally within the casing 22. In order to compensate for manufacturing tolerances and to prevent any tendency toward vibration within the casing structure, a plurality of stabilizing and positioning leaf spring members 86 (FIG. 5) are likewise provided on each strap member 82. As in the case of the positioning dimples 84, the leaf spring members 86 can be formed integrally with the strap member 82 by deformation with a suitable tool or punch (not shown). The spring members 86 thus provide resilient contact between adjacent portions of the fuel bundles 60A and 60B with the juxtaposed surfaces of the casing 22.

On the other hand, adjacent the juxtaposed ends of the fuel bundles 60A and 60B, the adjacent end portions thereof are only resiliently mounted relative to the casing 22. This is accomplished by providing, in the present example, a plurality of corner strap members 88 as better shown in FIG. 7 of the drawings. Of course, the strap members 88 can be passed entirely around the girth of the associated fuel bundles 60A and 60B but is not essential in this case, since the straps 88 are arranged only for resilient engagement with the adjacent inner surfaces of the casing 22. Thus, each of the corner straps 88 is provided with a pair of stabilizing springs 90 which desirably are formed integrally with the associated straps 88 as described previously in connection with the spring members 86 illustrated in FIGS. 3 and 5 of the drawings. Likewise, similar corner strap members 92 (FIG. 6) are provided at each juxtaposed end of the fuel bundles 60A and 60B. Each strap member 92 is provided with finger like spring projections 94 which in turn afford lateral, resilient engagement with the adjacent surfaces of the casing 22. It will be seen then that the positioning dimples 84 are entirely omitted from the corner straps 88 and 92 so that substantially one-half of each fuel bundle 60A or 60B is free to bow or to bend laterally relative to the casing 22 and within the confines thereof and against the action of the spring members 90 and 94.

Figure 8:
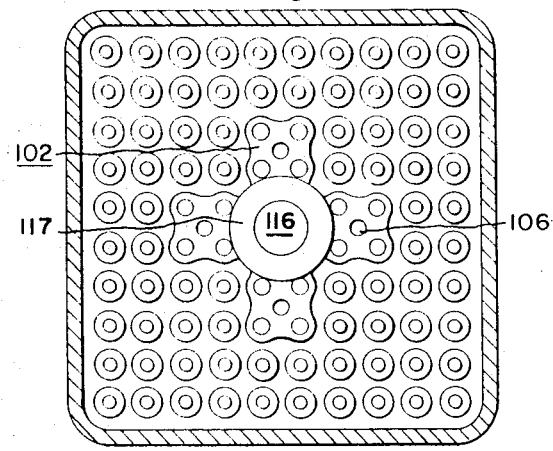
FIG. 8 is an enlarged cross-sectioned view of the fuel assembly above the left-hand fuel bundle as viewed in FIG. 1 of the drawings and taken along reference line VIII—VIII thereof.

Returning now to the specific structural means for mounting each of the fuel bundles 60A and 60B of FIG. 1, it will be seen that the outer end of each fuel bundle 60A or 60B is provided with a partial end plate 102 or 104 of cruciform configuration in this example. The end plates 102 and 104, together with other structural components of the fuel assembly, can be fabricated from stainless steel or from zirconium or one of its alloys. The cruciform configuration minimizes resistance to coolant flow longitudinally through the fuel assembly casing 22, and the resistance thereof is further reduced by the provision of at least one coolant flow opening 106 (FIG. 8) in each arm of the cruciform end plate 102 or 104. As better shown in FIG. 8, each end plate 102 or 104 is joined to the adjacent end plugs of the 16 fuel rods which are longitudinally aligned with the associated end plate. The end plates 102 and 104 are thus securely affixed to the outer ends of their associated fuel bundles 60A and 60B inasmuch as all of the fuel rods 66 of each bundle are joined laterally and rigidly to one another as explained above in connection with FIGS. 2 and 3 of the drawings.

In addition to its cruciform arms, each partial end plate 102 or 104 includes a central hub member 108 or 110 respectively, which is additionally arranged for joining the end plate to associated structural components of the fuel assembly. The end plates 102 and 104 and their associated fuel bundles 60A and 60B are maintained in their tandemly spaced relation by means of a continuous expansion control member, in this case a cermet or alloy rod 112 containing fissile material, which extends longitudinally and desirably centrally through both of the fuel bundles 60A and 60B and across a gap 96 therebetween. The rod 112 includes a quantity of nuclear fuel material 113 (FIG. 2) in the form of metal alloy, cermet, or other fuel bearing material having predictable thermal expansion, which may be contained in a suitable casing or cladding structure 114 which is sealably closed at its ends by end plugs 116 in any well known manner as by welding. The end plugs 116 are secured to the adjacent outer ends of the end plate hub members 108 and 110 by threading the nuts 117 on the threaded end portions at the outer ends of plugs 116.

In order to preserve at all times, the gap 96 between the fuel bundles 60A and 60B during thermal cycling of the fuel assemblies under all reactor operating conditions, it is desirable to provide the rod 112 with at least the same thermal coefficient of expansion exhibited by the fuel rods 66 of each fuel bundle. Thus, as the juxtaposed ends of the fuel bundles 60A and 60B tend to move toward each other as the fuel bundles thermally elongate and thus tend to close the gap 96, the end plate 102 is moved at least an equivalent distance toward the adjacent fertile bundle 62 for the purpose of at least maintaining the gap 96 between the fuel bundles. To provide for such movement of the end plate 102 by the central rod 112, an additional gap 118 is provided between end plate 120 of the fertile bundle 62 and the partial end plate 102 of the adjacent fuel bundle 60A.

With this arrangement as the reactor temperature increases, the central supporting rod 112 will tend to elongate in the direction denoted by arrow 122. At the same time, each of the fuel bundles 60A and 60B will tend to elongate only axially in the regions of their positive positioning straps 82 as denoted by arrows 125 and 126 respectively. However, in the regions of the stabilizing corner straps 88 and 92, the fuel bundles 60A and 60B will tend not only to elongate toward each other but also to bend laterally as beams in the direction denoted by arrows 128 and 130 respectively. The direction of bending or bowing results from the assumption that the right side of the fuel assembly, as viewed in FIG. 1 of the drawings, is presented toward the central, hottest or highest flux portion of the reactor core. Accordingly, those fuel rods 66 on the hottest side of the fuel assembly will be elongated slightly more than those rods on the opposite sides of the fuel bundles 60A and 60B, with the result that the fuel bundles 60A and 60B will bend as shown by arrows 128 and 130 respectively since the fuel rods 66 of each bundle are joined laterally and rigidly to one another. As a result, the indicated lateral movement of the juxtaposed end portions of the fuel bundles 60A and 60B displaces fuel material away from the central, hottest or highest flux portion of the reactor core in order to introduce a factor of negative coefficient of reactivity due to such displacement.

Figures 2, 3:
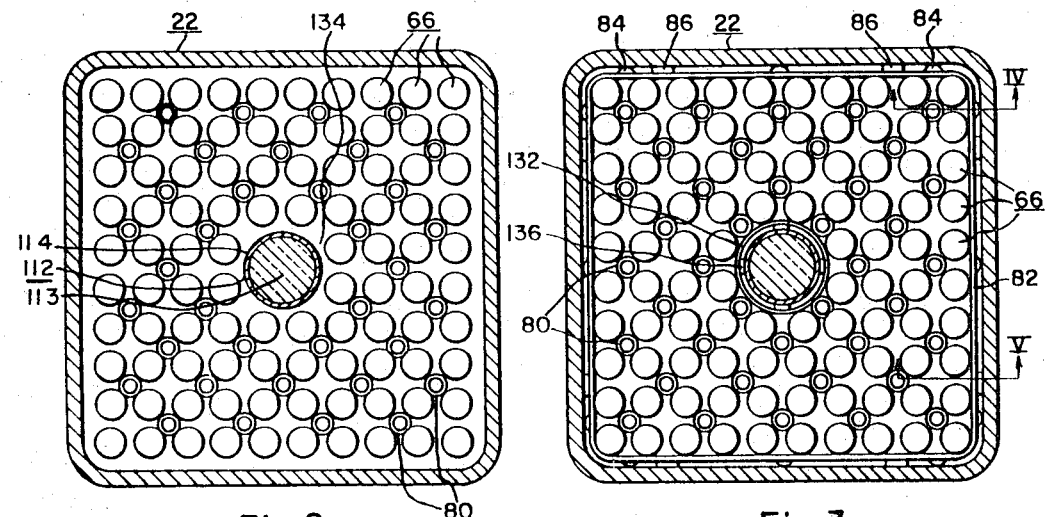
FIG. 2 is an enlarged cross-sectioned view of the fuel assembly of FIG. 1 and taken along any of reference lines II—II thereof.
FIG. 3 is another enlarged cross-sectioned view of the fuel assembly of FIG. 1 taken along any of reference lines III—III thereof.
Figure 5:
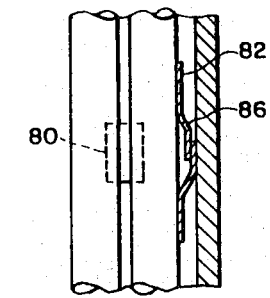
FIG. 5 is an enlarged partial longitudinally sectioned view of the fuel assembly illustrated in FIG. 3 and taken along reference line V—V thereof.
Figures 6, 7:
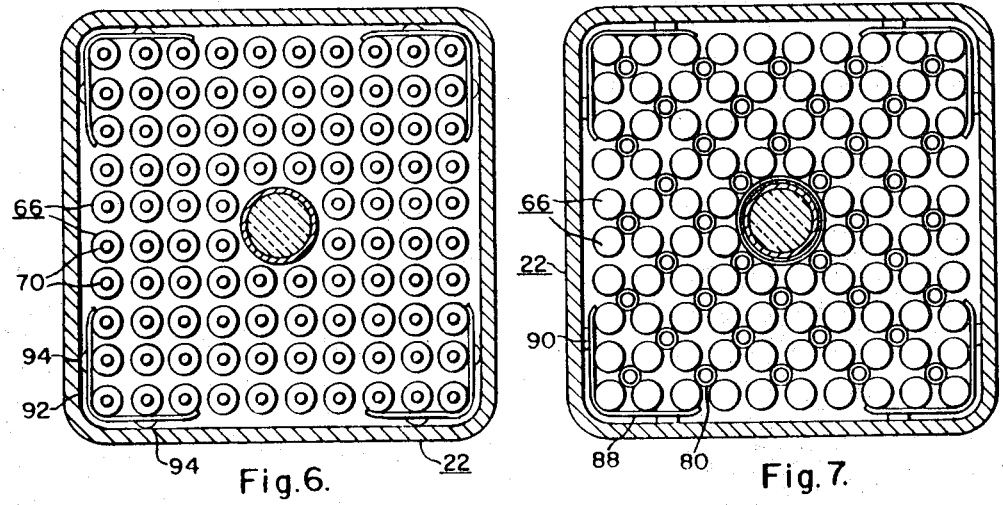
FIG. 6 is an enlarged cross-sectioned view of the fuel assembly of FIG. 1 and taken along reference line VI—VI thereof.
FIG. 7 is an enlarged cross-sectioned view of the fuel assembly of FIG. 1 and taken along either of reference lines VII—VII thereof.

Due to the various differential movements between the central supporting rod 112 and the fuel bundles 60A and 60B as denoted by the aforementioned arrows 122–130, the central rod 112 desirably is mounted slidably and resiliently throughout its passage through the fuel bundles 60A and 60B. One arrangement for so doing is illustrated in FIGS. 1 and 3 of the drawings. Thus, a plurality of resilient ring members 132 (FIG. 3) are inserted into and closely fitted within the central longitudinal passage 134 (FIG. 2) extending through each of the fuel bundles 60A and 60B. Desirably, the ring members 132 closely engage the eight surrounding fuel rods and are spaced along the length of the aforementioned passage 134. Each ring member 132 desirably is provided with a plurality of stabilizing spring members 136 formed integrally therewith in the manner described above in connection with the peripheral spring members 86 (FIG. 5). The spring members 136 are disposed to engage resiliently the central supporting rod 112 which is inserted through the ring members 132.

The assembly thus comprising the two fuel bundles 60A and 60B, their end plates 102 and 104 and the central supporting member 112 extending therebetween is then joined at the outward end or bottom end as viewed in FIG. 1 of the drawings of the fuel bundle 60B by securing the outward end of the hub 110 of the partial end plate 104 to a similar hub member 138 of end plate 140 forming part of the fertile fuel bundle 64. This joint can be effected by inserting the adjacent end of hub 110 into a counter sunk portion 142 of the blanket end plate 140 in a shrink fit manner or by welding, threading, or the like. In this example, the end plug 116 has a shoulder 123 bearing against the hub 110, and the nut 117 is utilized to secure hub 138 to hub 110. Then a frustoconical strainer 144 is joined at its larger end as by welding to the end plate member 146 of the fertile bundle 64. The end plate 146, which is annular in configuration, in turn is secured to the inner surface of the fuel assembly casing 22 preferably at the welded junction therebetween and the hollow end piece 40 all of which are secured by the circumferential weld 148. The frustoconical strainer 144 extends from end plate 146 towards end plate 140 to a location denoted by reference character 149, which is a short distance from the nut 117. However, a strainer 144' can also be extended towards end plate 194 (FIG. 17) until it engages the end plate 194 so as to support the fuel rods 192 and their associated structure. The frustoconical strainer 144 is perforated at the top and along its length as denoted by the reference character 150 in order to provide flow communication of the flow passages among the rods of the fertile bundles 62 and 64 and the fuel rods 66 with the interior of lower nozzle structure 24 as denoted by flow arrow 152.

Figure 10:
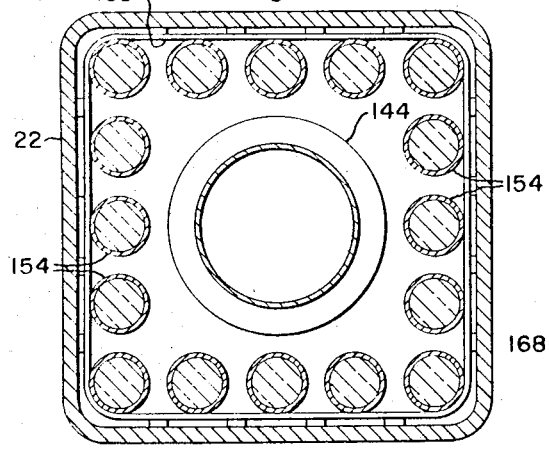
FIG. 10 is an enlarged cross-sectioned view of the right-hand fertile rod portion of the fuel assembly illustrated in FIG. 1 and taken along reference line X—X thereof.

In this arrangement, the fertile bundle 64 is completed by a plurality of fertile material bearing rods 154 which generally surround the frustoconical stainers 144, as better shown in FIG. 10 of the drawings. Each of the rods 154 is rigidly joined at its ends to the end plates 140 and 146 respectively. Expansion of the rods 154 in the fertile bundle 64 and differential expansion among the rods 154 are afforded by means of a gap 156 between the outer periphery of end plate 140 and the casing 22. Adjacent the end plate 140 of the fertile bundle 64, the rods 154 are supported laterally by a strap member 158 which is arranged in a manner similar to the strap members 82 described above in connection with FIGS. 3, 4 and 5 of the drawings.

Figure 11:
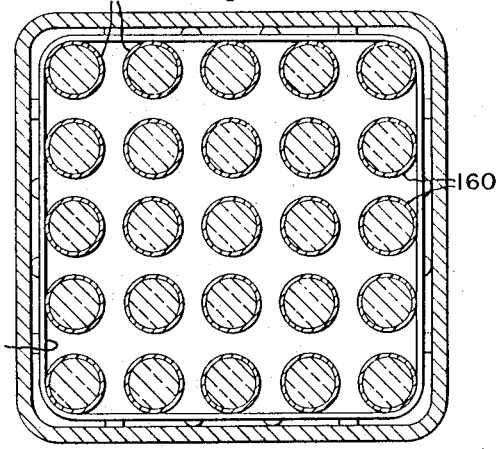
FIG. 11 is an enlarged cross-sectional view of the left-hand fertile portion of the fuel assembly of FIG. 1 taken along reference line XI—XI thereof.

The upper or left hand fertile bundle 62 is formulated in a similar manner with the exception that the frustoconical strainer 144 is not utilized. As better shown in FIG. 11, it will be seen that the fertile bundle 62 is fabricated from a plurality of fertile material bearing rods 160 supported at their ends by a pair of spaced end plates 120 and 162. The upper end plate 162 is closely fitted within the fuel assembly casing 22 and in addition is provided with, in this example, four tabs 164 which are respectively inserted into the slots 30 at the adjacent end of the casing 22. Such insertion is made, of course, before assembling the hook member 26 to the housing 22. Following such assembly, however, the hook member 26 and the end plate 162 are secured in their illustrated positions on the housing 22 by means of suitable weldments 166.

The other end plate 120 of the fertile bundle 62 is mounted in a "floating" manner by securance to the adjacent ends of the rods 160. Finally, the free end or lower end of the fertile bundle 62 is supported laterally by a strap member 168 which is similar to the strap 158 described above in connection with the other fertile bundle 64.

Inasmuch as the fertile rods 154 and 160 of the fertile bundles 64 and 62, respectively, are not each joined rigidly and laterally to adjacent fertile rods, it is anticipated that little or no bowing of the fertile bundles 64 and 62 will occur. Any such bowing for fertile bundle 62 that does occur, however, will be exerted downwardly and laterally against the fuel assembly casing 22, as viewed in FIG. 1 of the drawings, and away from the hottest portion of the reactor core so that any such bowing will tend to displace fuel material away from the hottest portion of the reactor core to further enhance the negative coefficient of reactivity introduced by the fuel assembly of the invention.

Figure 9:
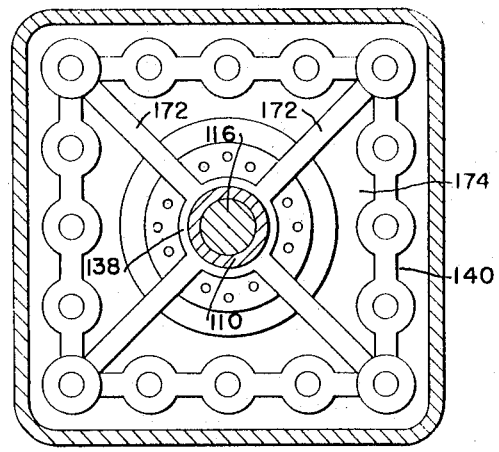
FIG. 9 is an enlarged cross-sectioned view of the fuel assembly above the right-hand blanket or fertile rod bundle as viewed in FIG. 1 of the drawings and taken along reference line IX—IX thereof.

The use of the lateral supporting straps 158 and 168 of the fertile bundles 64 and 62 further maintains the fertile bundles coaxially with the fuel assembly casing 22 so as not to interfere with the symmetric flow of coolant fluid therethrough. As evident from FIG. 12 of the drawings such coolant flow is conducted through relatively large flow openings 170 formed in the upper plate 162. Similar openings (not shown) are provided in the lower plate 120 of the fertile bundle 62. In the lower fertile bundle 64, which is substantially comprised of an annular array of fertile rods 154, coolant flow is conducted therethrough by means of imparting an annular configuration to the end plate 140 as better shown in FIG. 9 of the drawings. The end plate 140 is supported on its central hub member 138 by means of a plurality of spokes 172. Thus, several large flow openings 174 are afforded in the end plate 140 through which coolant is conducted from the perforated frustoconical strainer 144 in the manner described above.

Any tendency of the upper fertile bundle 62 to elongate thermally will, of course, move the lower end plate 120 into the gap 118 provided between the end plate 120 and the upper partial plate 102 of the fuel bundle 60A for the previously mentioned purposes. In a like manner, the tendency of the lower fertile rods 154 to elongate thermally will move the central supporting rod 112 and its associated structure towards and/or into the gap 118, as the central supporting rod 112 has a continuous length extending from end plate 140 through the two fuel bundles 60B and 60A. On the other hand, any tendency of the lower fertile rods 154 to elongate differentially as to each other will flex the central supporting rod 112 or the spokes 172 of the end plate 140 of the fertile bundle 64, inasmuch as little or no heat will be generated in the perforated frustoconical strainer 144. Therefore, thermal elongation of the lower fertile bundle 64 will not in turn cause a significant radial displacement of the fuel bundles 60A and 60B.

Referring now to FIGS. 17 to 22 of the drawings, another form of the fuel assembly of the invention is illustrated therein. The outward appearance of the fuel assembly 20' of FIG. 17 is substantially identical to that of FIG. 1, and accordingly the upper and part of the lower end portions and associated upper core plate 56 have been eliminated. In the form of the invention now under consideration, the fuel assembly includes a casing structure 22' containing adjacent its end portions upper and lower fertile bundles 62' and 64' respectively. The fertile bundles 62' and 64' are substantially identical to the fertile bundles 62 and 64 respectively of FIG. 1 with the exception that in each 62' and 64' at least one transverse array of connecting ferrules 180 or 182 respectively are employed to join rigidly and laterally the fertile rods 160' and 154' to one another in order to rigidize the fertile bundles 62' and 64'. The aforementioned arrangements are shown respectively in FIGS. 21 and 22, which also show the use of circumferential straps 184 and 186 for use in positioning the adjacent portions of the bundles 62' and 64' respectively relative to the inner surface of the fuel assembly casing 22'. The straps 184 and 186 are fabricated similarly to the straps 82, 158 and 168 of FIGS. 1 to 4 of the drawings. With the added, rigidized characteristic of the fertile bundle 62' and 64', the latter will now bend as beams away from the central, hottest or highest flux portion of the reactor core, if any differential expansion occurs among the rods 160' or 154', carrying with them a slight displacement of the intermediate portion of the fuel assembly housing 22' together with the fuel material housed therein.

Figure 19:
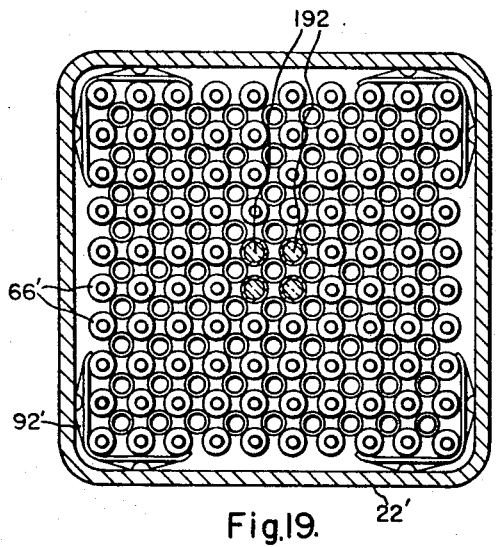
FIG. 19 is an enlarged cross-sectional view of the fuel assembly illustrated in FIG. 17 and taken along reference line XIX—XIX thereof.
Figure 20:
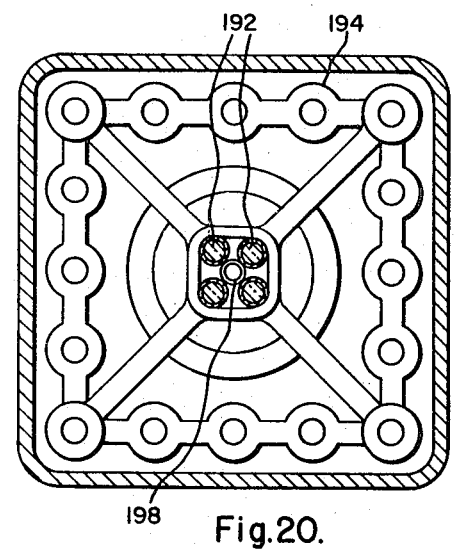
FIG. 20 is an enlarged cross-sectional view of the fuel assembly illustrated in FIG. 17 and taken along reference line XX—XX thereof.
Figure 21:
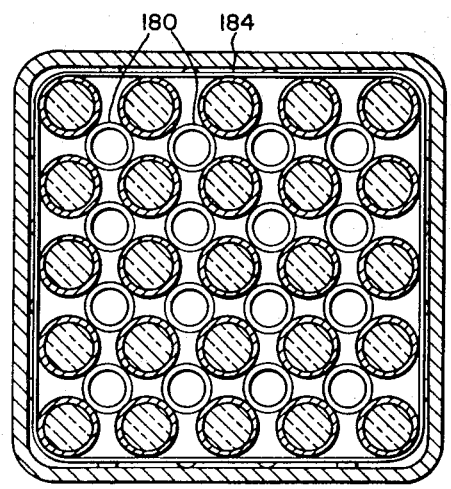
FIG. 21 is an enlarged cross-sectional view of the fuel assembly illustrated in FIG. 17 and taken along reference line XXI—XXI thereof.
Figure 22:
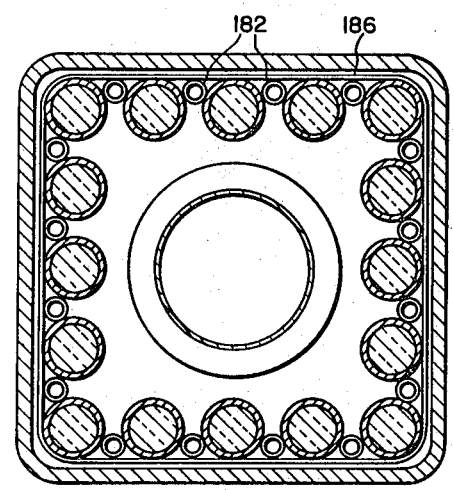
FIG. 22 is an enlarged cross-sectional view of the fuel assembly illustrated in FIG. 17 and taken along reference line XXII—XXII thereof.

Referring now principally to FIGS. 17, 18 and 19, it will be seen that the intermediate portion of the fuel assembly housing 22' includes a pair of tandemly spaced fuel bundle arrangements 188A and 188B. The fuel bundles 188A and 188B are supported within the fuel assembly casing 22' in much the same manner as described previously in connection with the fuel bundles 60A and 60B. There are, however, several important differences in the specific mounting or supporting structure. It will also be understood as this description proceeds that a greater number of fuel bundles 188 than that shown can be employed in certain applications of the invention.

As in the case of FIG. 1, the form of the invention of FIG. 17 is arranged with an expansion space 190 between the upper fertile bundle 62' and the upper fuel bundle 188A in order to accommodate the opposing thermal elongations of the fertile bundle and the fuel bundle which are slidably mounted within the casing 22' as noted above in connection with FIG. 1.

A glance at FIG. 17 also reveals that the end plates associated with the fuel bundles 62 and 64 of FIG. 1 have been eliminated. Similarly, the central longitudinal supporting rod 112 of FIG. 1 is omitted and its function is performed in this example, by four centrally disposed and continuously extending fuel rods 192 through both of the fuel bundles 188A and 188B, as better shown in FIG. 18. These continuously extending fuel rods are composed of a metal alloy or cermet material having predictable expansion behavior.

Each of the fuel bundles 188A and 188B is otherwise made up of a plurality of fuel rods 66', which in this example are similar to the fuel rod 66 described above in connection with FIGS. 1 and 14 of the drawings. The fuel rods 66' are arranged in a square lattice array as shown in FIGS. 18 and 19 of the drawings, which further show that each of the central supporting rods 192 are of substantially the same cross-sectional configuration as the fuel rods 66' but which can also be of a larger cross-sectional configuration. With this arrangement, each fuel bundle 188A or 188B is afforded a more even or regular geometry such that hot spots and impedance to coolant flow therethrough is minimized.

At the outward or opposite ends of the fuel bundles 188A and 188B, all of the fuel rods 66' thereof together with the adjacent portions of the central supporting rods 192 are joined laterally and rigidly with the employment of a suitable number of relatively short flow conducting ferrules 80', as illustrated in FIG. 18. The ferrules 80' are generally similar to the ferrules 80 described previously in connection with FIGS. 1 to 3 of the drawings. However, in the case of FIG. 17, the outermost lateral array of ferrules presently under discussion are not staggered as in the case of FIGS. 2 and 3, inasmuch as the partial end plates 102 and 104 associated therewith are not employed in the modification of the invention presently under discussion.

When assembling the fuel bundle 188A or 188B, the straps 82', the ferrules 80' and all of the fuel rods 66' are brazed or otherwise secured together laterally into a rigid unit, which also serves to join the outermost end of the fuel bundle 188A or 188B to the associated end portions of the central supporting rods 192. Similarly, lateral supporting straps 82', 88' and 92' are secured along the length of each fuel bundle 188A and 188B for the purposes described previously in connection with similar items of FIG. 1.

The central supporting rods 192 extend through both bundles 188A and 188B and across the gap 96" therebetween as shown by FIG. 17. The central supporting rods protrude from the lower or right end of the fuel bundle 188B as viewed in FIG. 17 of the drawings and as further shown by FIG. 20 thereof for connection to the adjacent end plate 194 of the lower fertile bundle 64' in a manner presently to be described.

In those applications wherein the fuel rods 66' are fabricated from the same material as the central supporting fuel rods 192 and therefore have the same coefficient of thermal elongation, the remainder of each fuel bundle 188A or 188B can be laterally joined at spaced locations therealong in a similar manner such as that described in connection with FIG. 18.

The protruding lower ends of the supporting fuel rods 192 are inserted into a suitably shaped hub portion 196 of the end plate 194 forming part of the lower blanket assembly 64'. Securance therebetween is afforded by brazing the lower end portions of the supporting rods 192 to the inner wall surfaces of the hub 196 and to a central separating ferrule 198 as better shown in FIG. 20 of the drawings.

Thus, the lower ends of the supporting rods 192 are attached to the upper end of the lower blanket assembly 64' in the manner similar to that described previously in connection with the central supporting rod 112 of FIG. 1. The fuel bundles 188A and 188B, however, are slidably mounted within the casing 22' and are arranged for bowing compensation in the same manner as the fuel bundles 60A and 60B of FIG. 1. The necessary gap 96" therefore is preserved during all thermal conditions of reactor operation by the fact that the supporting rods 192 have at least the same coefficient of thermal expansion as the fuel rods 66'. On the other hand, as will be described in greater detail hereinafter, the central supporting rod 112 or the supporting rods 192 can be fabricated from structural and/or nuclear fuel materials, for example a cermet, having a significantly larger coefficient of thermal elongation than the fuel rods 66 or 66'. With the latter arrangement, the gap 96 or 96" will be widened and the associated fuel bundles moved apart as the temperature of rod 112 or rods 192 increases in order to enhance a negative coefficient of reactivity or to introduce such a coefficient in certain applications of the invention.

Figure 23:
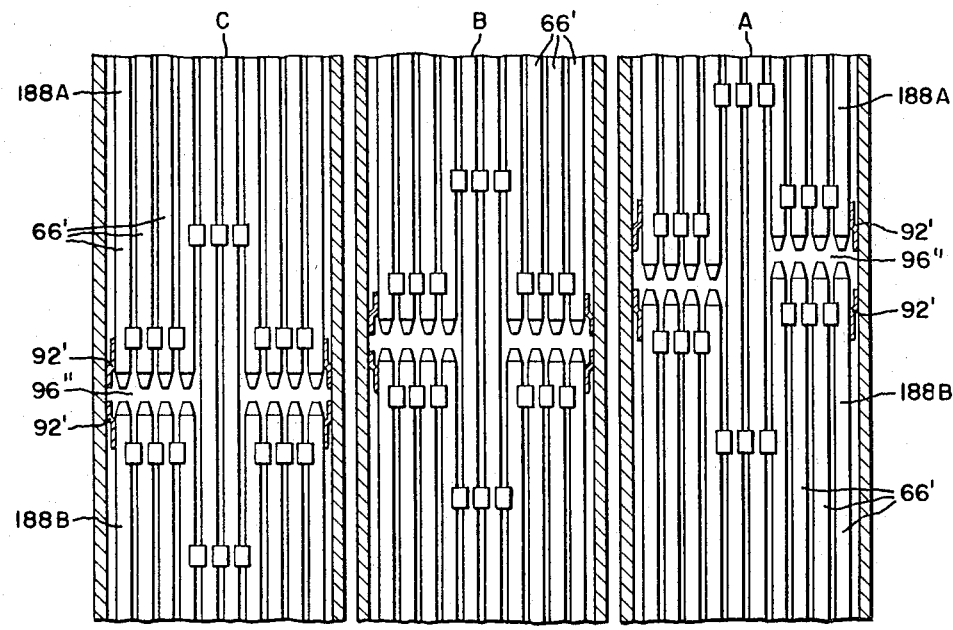
FIG. 23 is a partial, longitudinally sectioned view of a portion of a reactor core constructed in accordance with the invention and illustrating portions of a plurality of adjacent fuel assemblies, with each being arranged also in accordance with the invention.

Before proceeding further, however, with this aspect of the invention, a word should be said concerning the prospects of radiation streaming when employing a plurality of the fuel assemblies of FIG. 1 or of FIG. 17 in order to formulate a reactor core. Of course, such radiation streaming can be minimized or avoided altogether by avoiding the placement of all of the gaps 96 or 96" in the same horizontal plane passing through the reactor core. This can be accomplished readily by employing one or both of the arrangements illustrated in FIG. 23 of the drawings. With the arrangement shown, radiation streaming is minimized by staggering portions of the gap 96" as in fuel assembly A or by staggering the gaps of adjacent fuel assemblies as illustrated by assemblies B and C of FIG. 23. Either arrangement can be accomplished readily by providing longer and shorter fuel rods 66 or 66' in each fuel bundle 60 or 188 as in fuel assembly A or by providing longer and shorter fuel bundles and relatively reversing the same as in fuel assemblies B and C.

Referring once again to FIGS. 1 to 5 of the drawings, it will be recalled that the central supporting member or rod 112 is rigidly joined adjacent its ends to the outer, opposite ends of the fuel bundles 60A and 60B by means of the partial end plates 102 and 104, and that the remainder of the supporting rod 112 is slidably mounted within the remaining portions of the fuel bundles 60A and 60B by means of the resiliently mounted ring members 132. With this arrangement, then, a central supporting rod 112 having a significantly differing coefficient of termal elongation can be employed as compared to that of the adjacent fuel rods 66. In this application of the invention, particularly as contemplated for use in a fast reactor or in other reactors having otherwise a net positive coefficient of reactivity, it is intended that the gap 96 shall be increased or widened with increasing temperature such that the fuel bundles 60A and 60B are separated increasingly with an increase in temperature. This separation of the chain reacting masses represented by the fuel bundles 60A and 60B operates to introduce a negative coefficient of reactivity into the chain reacting system. It is desirable but not necessary for the proper functioning of the invention that the separation at dangerously high reactor core temperatures be adequate to cause the chain reacting mass or reactor core to become sub-critical.

In furtherance of this purpose, the central supporting rod 112 is fabricated from a cermet material such as $UO_2$-stainless steel or $PuO_2$-stainless steel, or of fuel bearing alloys such as U-Mo or fissium; while the fuel rods 66 are fabricated from stainless steel cladding tubes substantially filled with closely fitting pellets of very dense uranium dioxide ($UO_2$), or plutonium uranium dioxide ($PuO_2$—$UO_2$) or other ceramic fuel compounds. Alternately the steel cladding tubes may be filled with compacted powder composed of ceramic fuel compounds. Thus, the thermal elongation of the supporting rod will be substantially greater than that of the fuel rods 66.

For the ceramic fuel bundles 60 with the cermet or metal alloy expansion control member or central supporting rod 112 it is important to observe that during very rapid changes in increased power level a unique phenomena occurs. Rapid changes may be roughly defined as changes occuring at a rate which would double the reactor power output in a few seconds or less. Under these extreme and possibly dangerous conditions, the thermal expansion of the expansion control member 112 commences before the thermal expansion of the fuel rods or tubes 66 enclosing the fuel in the bundles. This occurs because the heat is generated directly within the expansion control member 112 causing an immediate temperature rise and expansion, while in the fuel rods 66 the heat is generated in the ceramic material and must then be transferred in a finite amount of time to the clad material 114 before the clad material temperature rises. Thus, the displacement of fuel from the center and most important portion of the core is greater during fast transients than during slow changes. Thus the effectiveness of the expansion control is greater during fast transients when it is most needed, than during normal power operation. This is a unique feature of this concept, not shared by other inherent mechanisms.

In a similar manner, the four central supporting rods 192 of FIG. 17 for this feature of the invention are likewise fabricated from the aforementioned cermet materials or alloys. The displacement of the fuel bundles 188A and 188B longitudinally away from each other by thermal elongation of the supporting rods 192 also occurs as described above in connection with FIG. 1. Of course, as the fuel bundles 60A and 60B or 188A and 188B are joined at their outer ends to their respective supporting rods, the fuel rods 66 or 66' thereof will tend to elongate toward one another to close the gap 96 or 96''. However, the considerably greater thermal elongation of the supporting rods will more than compensate for this tendency and will widen the gap 96 or 96''. On the other hand, in those applications where additional separation is required the fuel bundles are mounted on the central supporting mechanism such that the thermal elongation of the ordinary fuel rods within the bundles is added rather than subtracted from the thermal elongation of the supporting mechanism. This arrangement is explained hereinafter in connection with FIG. 15 and FIG. 16 of the drawings.

Returning again to FIG. 17 of the drawings, a number of arrangements will now be, described for slidably mounting the central supporting rods 192 relative to the adjacent portions of the fuel bundles 188A and 188B other than the outer opposite ends thereof, which are rigidly joined to the supporting rods 192, as aforesaid. One such arrangement consists in forming the fuel bundles 188A and 188B by joining all of the fuel rods 66' laterally with their associated ferrules 80 and 80' but omitting the central supporting rods 192 and their associated ferrules as denoted by the reference lines 199 of FIG. 18. The omitted supporting rods 192 and their ferrules are then joined laterally as by brazing, in the manner described in the aforementioned copending application. The separate sub-assembly thus formed by the supporting rods 192 is then inserted into the channels formed through both of the fuel bundles 188A and 188B by the previously mentioned omission of the supporting rods 192. With brazing material having been first applied to the ferrules 80' at the end portions only of the sub-assembly of supporting rods 192, the fuel bundles 188A and 188B are positioned on the sub-assembly with the proper gap between the fuel bundles. Then the end portions thereof are heated sufficiently to braze and rigidly join the supporting rods 192 to the outer or opposite end portions of the bundles 188A and 188B. The remainder of the sub-assembly of supporting rods 192, however, is free to elongate differentially relative to the surrounding remaining portions of the fuel bundles 188A and 188B, because in this example the ferrules 80'' are secured only to the supporting rods 192. The expansion space 190 can, of course, be varied in keeping with the anticipated displacement of the fuel bundles 188A relative to the fuel bundle 188B as governed by the selection of fabricating and fuel materials for the central supporting rods 192 and the fuel rods 66'. Thus, the degree of negative coefficient of reactivity can likewise be varied depending upon the type of reactor for which the fuel assembly is employed. Of course, the greatest rate of displacement with increase in temperature as anticipated will be accorded to the fuel assembly of FIG. 1 or FIG. 17 when employed in a fast reactor core for the reasons aforesaid.

Referring now to FIGS. 15 and 16 of the drawings, an arrangement is illustrative therein for providing the maximum possible displacement of the fuel bundles 200 and 202 illustrated therein. The fuel bundles 200 and 202 are generally similar to the fuel bundles 60A and 60B, respectively of FIG. 1 with the exceptions that end plates means 98 and 100 are provided adjacent the juxtaposed ends and define the gap 96' therebetween rather than being disposed at the outward or opposite ends of the fuel bundles 200 and 202. For reasons also to be presently described, the bundles 200 and 202 differ in other important respect. The central supporting rod 112' at its passage through each of the bundles 200 and 202 is loosely encased in a central supporting sleeve 204 and 206 respectively. At their juxtaposed ends, i.e. adjacent the gap 96', the sleeves 204 and 206 are securely joined to the end plates 98 and 100 respectively. At their outer or opposite ends, the sleeves 204 and 206 are rigidly secured in this example by short spoked arrangements, denoted generally by the reference characters 208 and 210 respectively, to the central supporting rod 112'. Thus, with the arrangement of FIG. 15, the juxtaposed or inner ends of the fuel bundles 200 and 202 are rigidly joined to the outer end portions of the central supporting rod 112', rather than the outer or opposite ends of the fuel bundles as is the case of the bundles 60A and 60B in FIG. 1 or the bundles 188A and 188B in FIG. 17.

In the arrangement of FIG. 15, it is contemplated that the supporting sleeves 204 and 206 be fabricated from non-fuel bearing material such as stainless steel, such that the sleeves will have a lower thermal elongation relative to the fuel rods 66''. Therefore, at least a portion of the thermal elongation of the fuel rods 66'' will be additive relative to the thermal elongation of the central supporting rod 112' by further displacing fuel material away from the gap 96' and therefore the median horizontal plane of the reactor core, when the fuel assemblies are disposed vertically as is the case in most present or contemplated reactor designs. It is also contemplated that when a number of fuel assemblies corresponding to the modification of either FIG. 1 or FIG. 15 be employed in a reactor core that gaps 96 or 96' thereof can be staggered relative to adjacent fuel assemblies in the manner described previously in connection with FIG. 23 of the drawings.

Figure 24:
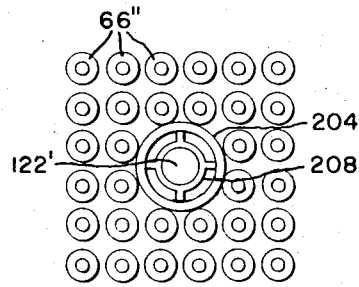
FIG. 24 is an enlarged partial cross-sectional view of the fuel assembly illustrated in FIG. 15 and taken along reference line XXIV—XXIV thereof.
Figure 25:
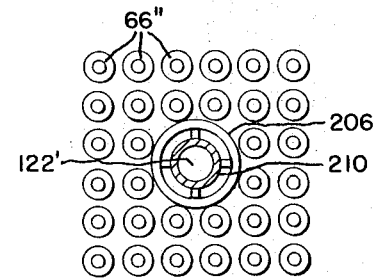
FIG. 25 is an enlarged partial cross-sectional view of the fuel assembly of FIG. 15 and taken along reference line XXV—XXV thereof.

As described above in connection with the central supporting rod 112 of FIG. 1, it is intended that the central supporting rod 112' be a fuel-bearing member, which arrangement of course, will necessitate supplying a certain amount of the coolant fluid thereto. In furtherance of this purpose and as illustrated in FIGS. 24 and 25, the spoked arrangements 208 and 210 afford coolant passages and access thereof to the annular spaces 212 maintained between the sleeves 204 and 206 and the central supporting rod 112'. The spaces 212 are maintained by means of dimples 214 preferably embossed on the inner surfaces of the sleeves 204 and 206, which desirably are further arranged together with the spoked arrangements 208 and 210 to maintain the central supporting member 112' coaxially within the sleeves 204 and 206.

Inasmuch as the sleeves 204 and 206 are non-fuel-bearing, they can engage directly the adjacent surfaces of the adjacent fuel rods 66" to provide support thereto throughout the length of the fuel bundles 200 and 202. However, if it is found in certain applications that hot spots develop at the junctions therebetween or if vibration ensues, then the sleeves 204 and 206 can be resiliently mounted within the associated bundles 200 and 202 by means of resilient ring members (not shown) such as those ring members 132 described above in connection with FIGS. 1 and 3 of the drawings by inserting the ring members coaxially between the sleeves 204, 206 and the adjacent fuel elements 66". The fuel bundles 200 and 202 are tandemly supported within the casing 22" of the fuel assembly by securing the spoked support 210 to a hub member 138' which in turn is joined to suitable supporting means (not shown) such as the end plate means 140 illustrated in FIG. 1. It is contemplated, of course, that the upper and lower fertile bundles 62 and 64 such as described in connection with FIG. 1 of the drawings can be employed in the fuel assembly of FIG. 15. With the central supporting rod 112' being spaced from the sleeves 204 and 206, coolant flow is afforded to the annular spaces therebetween as denoted by flow arrows 216.

From the foregoing, it will be apparent that novel and efficient forms of nuclear fuel assemblies have been disclosed herein. The various modifications of the fuel assembly as disclosed, can be employed to advantage in either thermal, epithermal, or fast nuclear reactors, wherever the problems of bowing occur or whenever it is desired to enhance or to introduce a negative coefficient of reactivity into the chain reacting mass.

Accordingly, numerous modifications of the invention will occur to those skilled in the art without departing from the spirit and scope of the invention. Moreover, certain features of the invention can be employed without a corresponding use of other features thereof. For example, either or both of the inventive features relating to bowing compensation and to the introduction of a negative coefficient of reactivity can be employed without utilizing one or both of the fertile bundles illustrated herein.

I claim as my invention:

1. In a fuel assembly for a neutronic reactor, the combination comprising an elongated casing structure, a plurality of elongated fuel bundles tandemly and slidably mounted within said casing structure, an elongated supporting member coextending with substantially a total combined length of said fuel bundles, at least two of said fuel bundles being joined at the opposite outwardly disposed end portions to said supporting member and disposed so that the remaining portions of said bundles are mounted for movement relative to the adjacent portions of said supporting member, said supporting member being fabricated from a material having a greater coefficient of expansion than that of said fuel bundles so that said fuel bundles are separated by elongation of said supporting member with increase in temperature of said fuel assembly.

2. In a fuel assembly for a neutronic reactor, the combination comprising an elongated casing structure, a plurality of elongated fuel bundles tandemly and slidably mounted within said casing structure, an elongated supporting member coextending with substantially a total combined length of said fuel bundles, at least two of said fuel bundles being joined at the opposite outwardly disposed end portions to said supporting member and disposed so that the remaining portions of said bundles are mounted for movement relative to the adjacent portions of said supporting member, said supporting member being fabricated from a material having a greater coefficient of expansion than that of said fuel bundles so that said fuel bundles are separated by elongation of said supporting member with increase in temperature of said fuel assembly, and said supporting member extending centrally and longitudinally through each of said fuel bundles, each of said fuel bundles being formed from a plurality of relatively closely spaced fuel rods disposed in a generally parallel array surrounding said supporting member, and said junction between said supporting member and the outer ends of said fuel bundles being effected by securing at least some of the adjacent ends of said fuel rods to end plate means forming part of said supporting member at said outer ends respectively.

3. In a fuel assembly for a neutronic reactor, the combination comprising an elongated casing structure, a plurality of elongated fuel bundles tandemly and slidably mounted within said casing structure, an elongated supporting member coextending with substantially a total combined length of said fuel bundles, at least two of said fuel bundles being joined at the opposite outwardly disposed end portions to said supporting member and disposed so that the remaining portions of said bundles are mounted for movement relative to the adjacent portions of said supporting member, said supporting member being fabricated from a material having a greater coefficient of expansion than that of said fuel bundles so that said fuel bundles are separated by elongation of said supporting member with increase in temperature of said fuel assembly, a fertile bundle mounted adjacent one end of said fuel assembly and secured at its inner end to said supporting member for supporting said member and said fuel bundles.

4. In a nuclear fuel assembly the combination comprising an elongated casing structure, a plurality of fuel bundles tandemly and slidably mounted within said casing structure, said fuel bundles having aligned generally centrally disposed channels extending respectively therethrough, an elongated supporting member substantially coextending with at least two of said fuel bundles, each of said last mentioned fuel bundles having a supporting sleeve mounted in its channel through which said supporting member is inserted, the adjacent juxtaposed ends of said sleeve being joined respectively to the adjacent juxtaposed ends of said last mentioned fuel bundles and having their other opposite ends secured to the adjacent portions of said supporting member respectively, said supporting member being fabricated from a material having a substantially higher coefficient of thermal elongation than that of said fuel bundles, and said sleeves being fabricated from a material having a substantially lower coefficient of thermal elongation than said fuel bundles so that an increase in the operating temperature of said fuel assembly results in fuel bundle separation and in that the thermal elongation of said fuel bundles is additive thereto.

5. In a nuclear fuel assembly the combination comprising an elongated casing structure, a plurality of fuel bundles tandemly and slidably mounted within said casing structure, said fuel bundles having aligned generally centrally disposed channels extending respectively therethrough, an elongated supporting member substantially coextending with at least two of said fuel bundles, each of said last mentioned fuel bundles having a supporting sleeve mounted in its channel through which said supporting member is inserted, the adjacent juxtaposed ends of said sleeve being joined respectively to the adjacent juxtaposed ends of said last mentioned fuel bundles and having their other opposite ends secured to the adjacent portions of said supporting member respectively, said supporting member being fabricated from a material having a substantially higher coefficient of thermal elongation than that of said fuel bundles, and said sleeves being fabricated from a material having a substantially lower coefficient of thermal elongation than said fuel bundles so that an increase in the operating temperature of said fuel assembly results in fuel bundle separation and in that the thermal elongation of said fuel bundles is additive thereto, at least a portion of said supporting member being fabricated from a fissile material, and said sleeves being spaced outwardly and generally concentrically of said supporting member to afford coolant flow passages therebetween.

6. In a nuclear fuel assembly the combination comprising an elongated casing structure, a plurality of fuel bundles tandemly and slidably mounted along the length of said casing structure, each of said fuel bundles being formulated from a plurality of discrete fuel rods arranged in a generally parallel lattice array extending longitudinally of said casing structure and further being formulated with a generally central passage extending longitudinally therethrough and in alignment with the passage of the adjacent fuel bundle, said passages being shaped to accommodate a plurality of supporting rods extending through said passages and through both of said bundles, said supporting rods being of substantially the same cross-sectional configuration as said fuel rods and being disposed to conform with said lattice array, means spaced along the length of each of said fuel bundles for joining said fuel rods of each bundle laterally to one another, an additional means for joining the outer opposite ends of said bundles to the adjacent end portions of said supporting rods, the remaining portions of said fuel bundles being slidably mounted upon said supporting rods, and said supporting rods being fabricated from a material having a substantially greater coefficient of thermal elongation than that of said fuel rods so that said fuel bundles are separated by said supporting rods upon an increase in operating temperature of said fuel assembly.

7. The combination of claim 6 wherein said fuel rods of each bundle are arranged in a predetermined lattice array, and said supporting rods contain nuclear fuel material, and including means for rigidly joining said supporting rods laterally at a number of positions spaced along the length thereof.

8. A fuel assembly for a neutronic reactor core comprising a supporting member, at least two fuel portions longitudinally mounted in tandem on and secured to said supporting member, and said supporting member being made of a material having a greater coefficient of expansion than that of said fuel portions, whereby an increase in temperature of said assembly causes said supporting member to expand more than said fuel portions to vary the spacing therebetween.

9. A nuclear fuel assembly for a reactor core comprising an elongated supporting member, a pair of fuel bundles disposed in a tandem relationship, a pair of supporting sleeves mounted on said supporting member, each of said sleeves having one end thereof joined to one of the adjacent juxtaposed ends of said last-mentioned fuel bundles, and each of said sleeves having its other end secured to said supporting member, whereby longitudinal separation of said fuel bundles occurs upon heating.

10. A fuel assembly for a neutronic reactor comprising an elongated supporting member, a plurality of elongated fuel bundles tandemly mounted on said supporting member, at least two of said fuel bundles being joined at the opposite outwardly disposed end portions thereof to said supporting member, means within said fuel assembly for longitudinally separating said fuel bundles upon a temperature increase, the remaining portions of said two bundles being free to move relative to the adjacent portions of said supporting member, said separating means being formed to expand said supporting member faster than said fuel bundles, and said supporting member being fabricated from a material having a greater coefficient of expansion than that of said fuel bundles so that said fuel bundles are separated by elongation of said supporting member with an increase in temperature of said fuel assembly.

References Cited

UNITED STATES PATENTS

| | | | |
|---|---|---|---|
| 2,841,545 | 7/1958 | Zinn | 176—78 X |
| 3,070,537 | 12/1962 | Treshow. | |
| 2,977,297 | 3/1961 | Evans et al. | 176—52 X |
| 3,128,235 | 4/1964 | Hackney et al. | 176—77 |
| 3,133,867 | 5/1964 | Frisch | 176—78 |
| 3,142,627 | 7/1964 | Emerson | 176—78 |
| 3,155,596 | 11/1964 | Frederick | 176—21 |
| 3,200,042 | 8/1965 | Schludi | 176—21 |
| 3,164,529 | 1/1965 | Waine et al. | 176—78 X |

FOREIGN PATENTS

| | | |
|---|---|---|
| 662,123 | 1/1958 | Canada. |

CARL D. QUARFORTH, *Primary Examiner.*

L. DEWAYNE RUTLEDGE, REUBEN EPSTEIN, *Examiners.*

R. L. GRUDZIECKI, *Assistant Examiner.*